United States Patent
Sundaram et al.

(10) Patent No.: US 12,472,988 B2
(45) Date of Patent: Nov. 18, 2025

(54) METHOD AND SYSTEM FOR PREDICTING GESTURE OF SUBJECTS SURROUNDING AN AUTONOMOUS VEHICLE

(71) Applicants: Wipro Limited, Bangalore (IN); Indian Institute of Science, Bangaluru (IN)

(72) Inventors: Suresh Sundaram, Bangalore (IN); Nishant Bhattacharya, Boulder, CO (US); Yuvika Dev Sharma, Bangalore (IN)

(73) Assignees: Wipro Limited, Bangalore (IN); Indian Institute of Science, Bangalore (IN)

( * ) Notice: Subject to any disclaimer, the term of this patent is extended or adjusted under 35 U.S.C. 154(b) by 116 days.

(21) Appl. No.: 18/426,901

(22) Filed: Jan. 30, 2024

(65) Prior Publication Data
US 2025/0074475 A1    Mar. 6, 2025

(30) Foreign Application Priority Data
Aug. 28, 2023   (IN) .............................. 202341057673

(51) Int. Cl.
*B60W 60/00*  (2020.01)
*B60W 50/00*  (2006.01)
(Continued)

(52) U.S. Cl.
CPC .. *B60W 60/00272* (2020.02); *B60W 50/0097* (2013.01); *G06V 20/58* (2022.01); *G06V 40/28* (2022.01); *B60W 2554/4041* (2020.02)

(58) Field of Classification Search
CPC ....... B60W 60/00272; B60W 50/0097; B60W 2554/4041; G06V 20/58; G06V 40/20–28
See application file for complete search history.

(56) References Cited

U.S. PATENT DOCUMENTS 11,577,722 B1 *   2/2023   Packer ................ G05D 1/0088
12,240,497 B1 *   3/2025   Lin ........................ G06V 40/10
(Continued)

FOREIGN PATENT DOCUMENTS

WO    WO-2024261695 A1 *   12/2024    ............. G06V 40/28

OTHER PUBLICATIONS

Bhattacharya et al., "CGAP2: Context and Gap Aware Predictive Pose Framework for Early Detection of Gestures", Indian Institute of Science, arxiv.org/pdf/2011.09216.pdf, Nov. 2020, 9 pages.
(Continued)

*Primary Examiner* — Courtney D Heinle
(74) *Attorney, Agent, or Firm* — Finnegan, Henderson, Farabow, Garrett & Dunner, LLP (57) ABSTRACT

Embodiments of present disclosure relates to method and gesture prediction system for predicting gesture of subjects for controlling AV during navigation. The gesture prediction system obtains data from sensors and generates context information of environment of AV. The gesture prediction system generates parameters for sampling frames for determining gesture of subjects. The gesture prediction system estimates current pose, and subsequent poses by extrapolating current pose and subsequent poses using deep learning techniques. Further, the gesture prediction system infers current behaviour of subjects by classifying current pose and subsequent poses into one of predefined gesture categories. The gesture prediction system predicts gesture of subjects based on current behaviour, context information and location information of subjects for controlling AV during navigation. Thus, the present disclosure forecast gestures of subjects at a faster rate and controls the AV during the navigation.

13 Claims, 5 Drawing Sheets

(51) Int. Cl.
*G06V 20/58* (2022.01)
*G06V 40/20* (2022.01)

(56) References Cited

U.S. PATENT DOCUMENTS

| | | | | |
|---|---|---|---|---|
| 2017/0327112 | A1* | 11/2017 | Yokoyama | B60W 50/0097 |
| 2018/0143644 | A1* | 5/2018 | Li | G06V 40/107 |
| 2019/0354194 | A1 | 11/2019 | Wang et al. | |
| 2020/0086879 | A1* | 3/2020 | Lakshmi Narayanan | G06V 20/597 |
| 2022/0148319 | A1* | 5/2022 | Chan | B60W 40/08 |
| 2022/0318560 | A1* | 10/2022 | Kishon | A23B 7/159 |
| 2023/0067485 | A1* | 3/2023 | Willoughby | B60W 60/00186 |
| 2023/0150550 | A1* | 5/2023 | Shi | G06V 10/82 701/23 |
| 2023/0219597 | A1* | 7/2023 | Cohen | B60W 60/001 701/23 |

OTHER PUBLICATIONS

Kim et al., "Real-Time Human Pose Estimation and Gesture Recognition from Depth Images Using Superpixels and SVM Classifier", Sensors, vol. 15, No. 6, https://doi.org/10.3390/s150612410, May 2015, 18 pages.

* cited by examiner

METHOD AND SYSTEM FOR PREDICTING GESTURE OF SUBJECTS SURROUNDING AN AUTONOMOUS VEHICLE

TECHNICAL FIELD

The present subject matter generally relates to Autonomous Vehicle (AV), more particularly, but not exclusively, relates to a method and system for predicting gesture of subjects surrounding an autonomous vehicle.

BACKGROUND

Autonomous Vehicles (AV) have advanced path planning systems which considers changing nature of a diverse surrounding of AV and take decisions while navigating the AV. Surrounding conditions around the AV may vary based on route it traverses, destination it has to reach, and other external factors such as weather. Such route/destination can be part of either urban region, rural region or highways. In some instances, the surrounding conditions may impact driving scenarios for the AV, which in turn may affect amount of data necessary to infer useful information from the surrounding for controlling the AV during navigation.

At present, existing systems do not consider influence of humans outside the AV during navigation. The AV may interact in different ways with the surrounding based on various subjects present outside the AV. Subjects outside the AV may include humans, say traffic police, pedestrians, and so on, who can perform gestures to communicate with drivers and therefore form an integral part of the surrounding conditions to be considered/recognized by the AV during navigation. The existing systems are unable to comprehend the gestures performed by humans and infer intention of those humans appropriately in order to take suitable actions while navigating. In addition, the existing systems are unable to predict the gestures of the humans timely for taking prompt decisions during navigation.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure relates to a method of predicting a gesture of subjects for controlling an Autonomous Vehicle (AV) during navigation. The method comprises obtaining data associated with a current environment of the AV from one or more sensors associated with the AV. The data comprises a plurality of frames and location information of the AV. The method further comprises generating context information associated with the current environment of the AV based on the obtained data. The context information comprises information associated with the current environment and information associated with one or more subjects present in the current environment. The method further comprises generating a plurality of parameters based on the location information and the context information for sampling the plurality of frames. The method comprises estimating a current pose and one or more subsequent poses of each of one or more subjects from each sampled frames using a deep learning technique. For estimating the one or more subsequent poses, the method comprises predicting the one or more subsequent poses to be performed by each of the one or more subjects based on one or more factors associated with corresponding estimated poses of the one or more subjects using the deep learning technique. The method comprises inferring a gesture category from a plurality of predefined gesture categories, for the one or more subsequent poses of each of the one or more subjects, based on corresponding current pose, the one or more subsequent poses and pre-existing gesture data of each of the one or more subjects. Thereafter, the method comprises predicting a gesture to be performed by each of the one or more subjects based on respective gesture category, the information associated with the one or more subjects, and the context information, for controlling the AV during navigation.

In an embodiment, the present disclosure relates to a gesture prediction system for predicting a gesture of subjects for controlling an Autonomous Vehicle (AV) during navigation. The gesture prediction system includes a processor and a memory communicatively coupled to the processor. The memory stores processor-executable instructions, which on execution cause the processor to predict a gesture of subjects for controlling the AV during navigation. The processor is configured to obtain data associated with a current environment of the AV from one or more sensors associated with the AV. The data comprises a plurality of frames and location information of the AV. Thereafter, the processor is configured to generate context information associated with the current environment of the AV based on the obtained data. The context information comprises information associated with the current environment and information associated with one or more subjects present in the current environment. The processor is configured to generate a plurality of parameters based on the location information and the context information for sampling the plurality of frames. The processor is configured to estimate a current pose and one or more subsequent poses of each of one or more subjects from each sampled frames using a deep learning technique. For estimating the one or more subsequent poses, the processor is configured to predict the one or more subsequent poses to be performed by each of the one or more subjects based on one or more factors associated with corresponding estimated poses of the one or more subjects using the deep learning technique. Subsequently, the processor is configured to infer a gesture category from a plurality of predefined gesture categories, for the one or more subsequent poses of each of the one or more subjects, based on corresponding current pose, the one or more subsequent poses and pre-existing gesture data of each of the one or more subjects. Lastly, the processor is configured to predict a gesture to be performed by each of the one or more subjects based on respective gesture category, the information associated with the one or more subjects, and the context information, for controlling the AV autonomous vehicle during navigation.

In an embodiment, the present disclosure relates to a non-transitory computer readable medium including instructions stored thereon that when processed by at least one processor may cause a gesture prediction system to obtain data associated with a current environment of the AV from one or more sensors associated with the AV. The data comprises a plurality of frames and location information of the AV. Thereafter, the instruction causes the processor to generate context information associated with the current environment of the AV based on the obtained data. The context information comprises information associated with the current environment and information associated with one or more subjects present in the current environment. The instruction causes the processor to generate a plurality of parameters based on the location information and the context information for sampling the plurality of frames. The instruction causes the processor to estimate a current pose and one or more subsequent poses of each of one or more subjects from each sampled frames using a deep learning technique. For estimating the one or more subsequent poses, the instruction causes the processor to predict the one or more subsequent poses to be performed by each of the one or more subjects based on one or more factors associated with corresponding estimated poses of the one or more subjects using the deep learning technique. Subsequently, the instruction causes the processor to infer a gesture category from a plurality of predefined gesture categories, for the one or more subsequent poses of each of the one or more subjects, based on corresponding current pose, the one or more subsequent poses and pre-existing gesture data of each of the one or more subjects. Lastly, the instruction causes the processor to predict a gesture to be performed by each of the one or more subjects based on respective gesture category, the information associated with the one or more subjects, and the context information, for controlling the AV autonomous vehicle during navigation.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The terms "includes", "including", or any other variations thereof, are intended to cover a non-exclusive inclusion, such that a setup, device, or method that includes a list of components or steps does not include only those components or steps but may include other components or steps not expressly listed or inherent to such setup or device or method. In other words, one or more elements in a system or apparatus proceeded by "includes . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Present disclosure relates to a gesture prediction system and a method for predicting a gesture of subjects for controlling an Autonomous Vehicle (AV) during navigation. Currently, existing systems do not consider human interactions (humans surrounding the AV) with the AV while navigating the AV. Thus, resulting in poor decision making of the AV during navigation. The present disclosure overcomes the above problem by predicting gestures of the subjects present around the AV during navigation. The present disclosure initially obtains location information of the AV and a plurality of frames of current environment of the AV. The plurality of frames of the current environment is utilized to generate context information of the current environment. The present disclosure utilizes the context information and the location information to generate parameters for sampling the plurality of frames. Further, the present disclosure estimates current pose and one or more subsequent poses of subjects around the AV using deep learning techniques. Thereafter, the present disclosure predicts gestures of the subjects based on the current pose, the one or more subsequent poses, and pre-existing gesture data of subjects in order to control the AV during navigation. Thus, the present disclosure is able to utilise the predicted gesture and the context information to take necessary action for vehicle maneuvering and avoid any accidents during the navigation.

Figure 1:
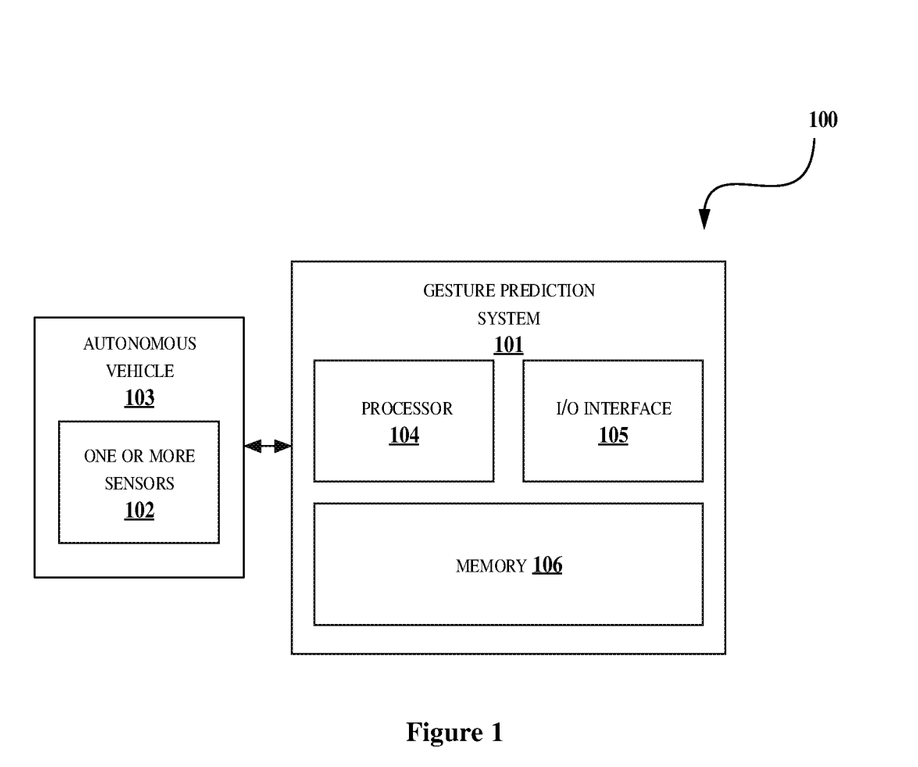
FIG. 1 shows an exemplary environment for predicting a gesture of subjects for controlling an Autonomous Vehicle (AV) during navigation, in accordance with some embodiments of the present disclosure.

FIG. 1 shows an exemplary environment 100 for predicting a gesture of subjects for controlling an Autonomous Vehicle during navigation. The exemplary environment 100 includes a gesture prediction system 101 and an Autonomous Vehicle (AV) 103. In an embodiment, the AV 103 is a vehicle capable of sensing its environment and operating without human involvement. The AV 103 may include, but is not limited to, a car, trucks, taxi, and the like. The AV 103 comprises one or more sensors 102 for obtaining sensor data of a current environment of the AV 103 during navigation. The AV 103 may include other units or components, not shown explicitly in FIG. 1. The one or more sensors 102 may include a capturing unit, a video recorder, a Light Detection and Ranging (LIDAR), a Radio Detection and Ranging (RADAR), an ultrasonic sensor, a Global Positioning System (GPS), an Inertial Measurement Unit (IMU), and the like for obtaining data associated with the current environment of the AV 103. A person skilled in the art will appreciate that the one or more sensors 102 may include any sensor other than the above-mentioned sensors for obtaining the data. The gesture prediction system 101 may communicate with the AV 103 via a communication network (not show explicitly in FIG. 1). The gesture prediction system 101 may include, but not limited to, a laptop computer, a desktop computer, a Personal Computer (PC), a notebook, a smartphone, a tablet, and the like.

Further, the gesture prediction system 101 may include a processor 104, a I/O interface 105, and a memory 106. In some embodiments, the memory 106 may be communicatively coupled to the processor 104. The memory 106 stores instructions, executable by the processor 104, which, on execution, may cause the gesture prediction system 101 to predict a gesture of the subjects for controlling the AV 103 during navigation, as disclosed in the present disclosure. The subjects may be any person who is performing a gesture to communicate with the AV 103. The subjects may include, but is not limited to, a pedestrian, a traffic police, and the like.

In an embodiment, the communication network may include, without limitation, a direct interconnection, Local Area Network (LAN), Wide Area Network (WAN), Controller Area Network (CAN), wireless network (e.g., using a Wireless Application Protocol), the Internet, and the like.

The gesture prediction system 101 obtains data associated with the current environment of the AV 103 from the one or more sensors 102. The one or more sensors 102 are associated with the AV 103. The data obtained from the one or more sensors 102 may include, but is not limited to, plurality of frames of the current environment of the AV 103, and location information of the AV 103. In an embodiment, the one or more sensors 102 are configured to capture environmental images, information related to one or more subjects present in the current environment, and data related to objects present around the AV 103. The objects may include, but is not limited to, vehicles, roads network, sign boards, traffic, vegetation, traffic lights and the like. The gesture prediction system 101 may communicate with the AV 103 for obtaining the plurality of frames of the current environment of the AV 103.

The gesture prediction system 101 may generate context information associated with the current environment of the AV 103 based on the obtained data. The context information/perception information may include information associated with the current environment of the AV 103, and information associated with one or more subjects present in the current environment. The information associated with the one or more subjects may include, but is not limited to, a class of the one or more subjects, a location of the one or more subjects, movement condition (stationary or moving) of the one or more subjects, and so on. In an embodiment, the gesture prediction system 101 uses deep learning algorithms and image processing techniques to extract the context information of the AV 103. The context information includes information on current visibility such as, rainy environment, clear environment, day, night, and humans/vehicles density around the AV 103. The context information also includes information about other vehicles around the AV 103. The information may be for instance, position of other vehicles, dimension of other vehicles, speed and, acceleration of the other vehicles and so on. In an embodiment, the gesture prediction system 101 may utilise object detection techniques to sample the one or more subjects from the plurality of frames. The one or more subjects may include any human beings performing a gesture that might influence the path of the AV 103. The one or more subjects may include, but is not limited to, pedestrians, traffic police personnel, and the like.

Further, the gesture prediction system 101 may generate a plurality of parameters based on the location information and the context information of the AV 103 for sampling the plurality of frames. The plurality of parameters comprise relational parameters and temporal parameters associated with the context information. The sampling of the plurality of frames is performed by controlling a number of the plurality of frames as input and a time interval between each of the plurality of frames. The relational parameters and the temporal parameters are dependent on the current environment and a current state of subjects surrounding the AV 103. The current environment and the current state of subjects may change throughout the path of the AV 103 from source to destination. In an embodiment, the location information and the context information are used to derive a configuration of relational and temporal parameters. The relational and temporal parameters are dynamically updated as and when driving conditions change throughout the path of the AV 103. The relational and temporal parameters are responsible for controlling the amount of information/plurality of frames available for determining behaviour of the one or more subjects by determining a frequency of sampling of the incoming plurality of frames.

The gesture prediction system 101 may estimate a current pose and one or more subsequent poses of each of the one or more subjects from each sampled frames using a deep learning technique. The current pose and the one or more subsequent poses are determined by estimating a three-dimensional pose of the one or more subjects from each of the sampled frames. Particularly, estimating the one or more subsequent poses includes predicting the one or more subsequent poses to be performed by each of the one or more subjects based on one or more factors using the deep learning technique. The one or more factors are associated with estimated poses of the one or more subjects. The gesture prediction system 101 may infer a gesture category from a plurality of predefined gesture categories, for the one or more subsequent poses, based on corresponding current pose, the one or more subsequent poses of each of the one or more subjects and pre-existing gesture data. The one or more subsequent poses are associated with each of the one or more subjects. In an embodiment, the gesture category may be referred as current behaviour of the one or more subjects. Further, the estimated current pose, the one or more subsequent poses are used to obtain pose motion of the one or more subjects. The obtained pose motion of the one or more subjects is extrapolated to predict the one or more subsequent poses of the one or more subjects. In an embodiment, an encoder-decoder architecture may be used to anticipate future video frames to obtain future poses with respect to the current pose of the one or more subjects.

Further, the gesture prediction system 101 may utilize the current pose, and the one or more subsequent poses to obtain concatenated pose data by temporally sequencing the current pose, and the one or more subsequent poses one after another. The concatenated pose data is used to classify the motions of the pose data (one or more subsequent poses) into one of the plurality of predefined gesture categories. The plurality of predefined gesture categories may include, but is not limited to, stop gesture, go gesture, turn left gesture, turn right gesture, turn around gesture, speed gestures, and the like. In an embodiment, the one or more subsequent poses are associated with timestamps to infer current behaviour of the one or more subjects using the deep learning techniques.

The gesture prediction system 101 may predict a gesture to be performed by each of the one or more subjects based on respective gesture category, the information associated with the one or more subjects, and the context information, for controlling the AV 103 during navigation. In an embodiment, the gesture category, the information associated with the one or more subjects, and the context information, are ensemble together to predict the gesture of the one or more subjects and arrive at a precise decision for navigating the AV 103 accordingly. Further, the gesture prediction system 101 may determine a priority of the gesture associated with the one or more subjects surrounding the AV 103. Thereafter, the gesture prediction system 101 may determine a navigational path for the AV 103 dynamically based on the priority and the location information with respect to a global map. In an embodiment, the navigational path is determined to dynamically plan a local trajectory for the AV 103, so that the AV 103 reaches its destination in less time without encountering any collision or delay. The navigational path may be used to generate control signals for throttle, brake, steer, and so on, accordingly for vehicle maneuvering along the planned trajectory.

Figure 2:
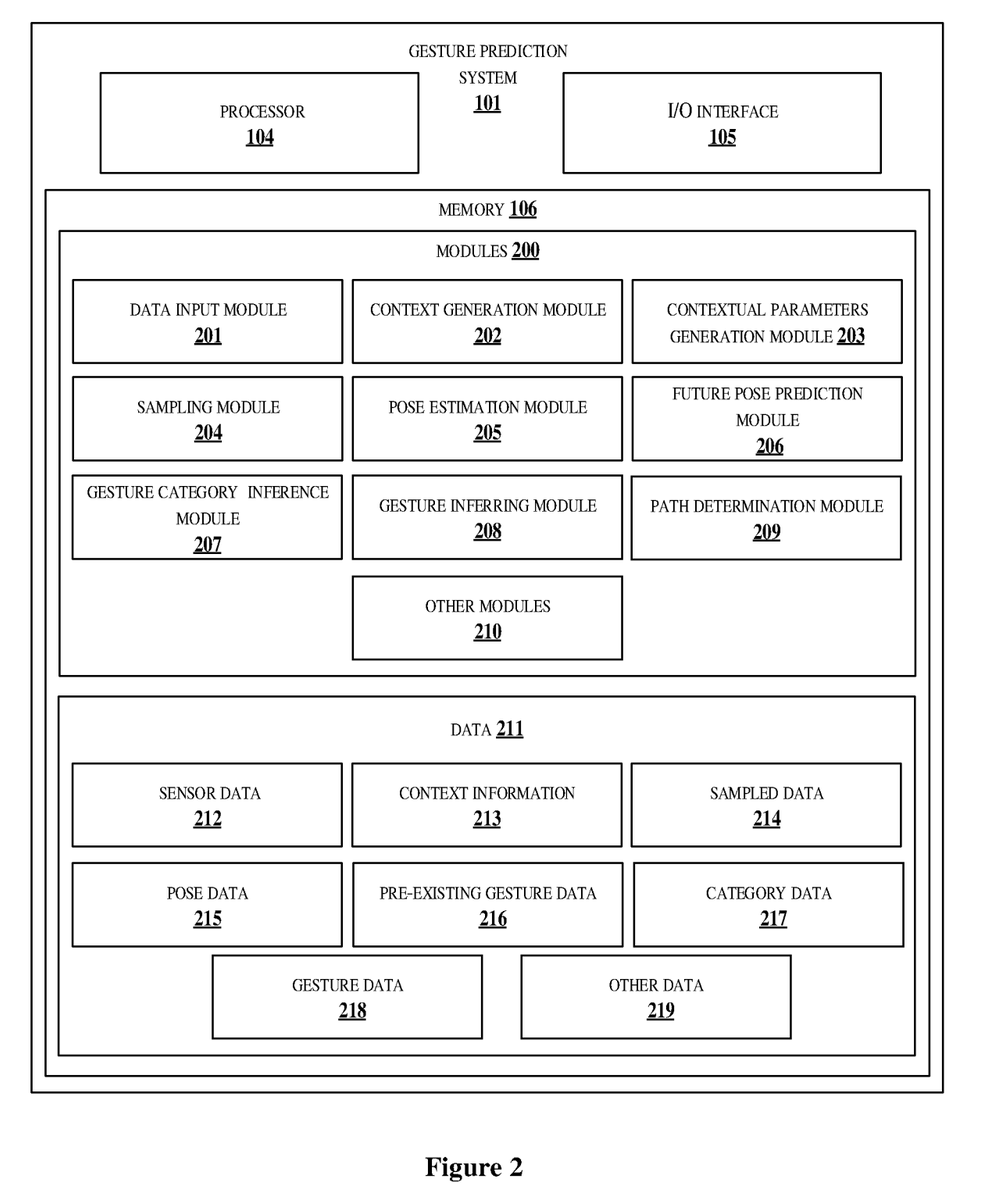
FIG. 2 shows a detailed block diagram of the gesture prediction system for predicting a gesture of subjects for controlling the AV during navigation, in accordance with some embodiments of the present disclosure.

FIG. 2 shows a detailed block diagram of a gesture prediction system for predicting a gesture of subjects for controlling an Autonomous Vehicle (AV) during navigation, in accordance with some embodiments of the present disclosure.

The gesture prediction system 101, in addition to the I/O interface 105 and processor 104 described above, includes one or more modules 200 and data 211 in the memory 106, which is described herein in detail.

In one implementation, the one or more modules 200 may include, but are not limited to, a data input module 201, a context generation module 202, a contextual parameters generation module 203, a sampling module 204, a pose estimation module 205, a future pose prediction module 206, a gesture category inference module 207, a gesture inferring module 208, path determination module 209 and other modules 210, associated with the gesture prediction system 101.

In an embodiment, data 211 in the memory 106 may include sensor data 212, context information 213, sampled data 214, pose data 215, pre-existing gesture data 216, category data 217, gesture data 218, and other data 219 associated with the gesture prediction system 101.

In an embodiment, the data 211 in the memory 106 may be processed by the one or more modules 200 of the gesture prediction system 101. The one or more modules 200 may be configured to perform the steps of the present disclosure using the data 211, for predicting a gesture of subjects for controlling the AV 103 during navigation. In an embodiment, each of the one or more modules 200 may be a hardware unit which may be outside the memory 106 and coupled with the gesture prediction system 101. In an embodiment, the one or more modules 200 may be implemented as dedicated units and when implemented in such a manner, said modules may be configured with the functionality defined in the present disclosure to result in a novel hardware. As used herein, the term module may refer to an Application Specific Integrated Circuit (ASIC), an electronic circuit, a Field-Programmable Gate Arrays (FPGA), Programmable System-on-Chip (PSoC), a combinational logic circuit, and/or other suitable components that provide the described functionality.

One or more modules 200 of the gesture prediction system 101 function to predict a gesture of subjects for controlling the AV 103 during navigation. The one or more modules 200 along with the data 211, may be implemented in any system, for predicting a gesture of subjects for controlling the AV 103 during navigation.

The sensor data 212 may include plurality of frames of the current environment of the AV 103 and location information of the AV 103 obtained from the one or more sensors 102. The sensor data 212 may also include point cloud data, GPS data, sound data, and the like. The one or more sensors may include, the camera, the LIDAR, the RADAR, the GPS and so on.

The context information 213 may include information associated with the current environment of the AV 103, and information associated with one or more subjects present in the current environment. The information associated with the one or more subjects may include a category of the one or more subjects, location of the one or more subjects, orientation of the one or more subjects, and movement information of the one or more subjects. The information associated with the current environment may include, number of objects present around the AV 103, and information related to the objects. The information related to the objects may include details regarding type of the objects (e.g., a vehicle), position of the objects, dimension of the objects, speed, and acceleration of the objects.

The sampled data 214 may include one or more frames of the plurality of frames which are sampled based on the location information and the context information 213.

The pose data 215 may include the current pose and the one or more subsequent poses of the one or more subjects.

The pre-existing gesture data 216 may include pre-stored poses of different subjects performing one or more gestures.

The category data 217 may include one or more gesture categories associated with the one or more subsequent poses of each of the one or more subjects.

The gesture data 218 may include the gesture which is to be performed by the one or more subjects based on the category data 217, information associated with the one or more subjects and the context information 213.

The other data 219 may store data, including temporary data and temporary files, generated by modules for performing the various functions of the gesture prediction system 101.

The data input module 201 may obtain the data associated with the current environment of the AV 103 from the one or more sensors 102 associated with the AV 103. The one or more sensors 102 captures information of the current environment of the AV 103 using the one or more sensors 102 like the camera, the LIDAR, the RADAR, the ultrasonic sensor, the GPS, and the IMU. The data from the one or more sensors 102 comprises a plurality of frames of the current environment of the AV 103, and location information of the AV 103. In an embodiment, the data from the one or more sensors 102 may also include, point cloud data, GPS data, sound data and so on. The context generation module 202 may generate the context information of the current environment of the AV 103. The context information is associated with the current environment of the AV 103, and information related to one or more subjects which are present around the AV 103. The context generation module 202 may utilise different deep learning techniques, image processing techniques, and object detection techniques to generate the context information based on analysis of the obtained data. In an embodiment, the context generation module 202 analyses the obtained data to determine the type of environment the AV 103 is driving in, such as whether the path belongs to rural, urban or highway region, or a lane used by the AV 103 or weather around the AV 103. The context generation module 202 also detects objects and subjects present nearby the AV 103 from the plurality of frames and related information based on analysis of the obtained data. The objects around the AV 103 may include other vehicles such as, cars, bikes, trucks and so on. The context information includes details regarding the objects which are present near the AV 103, environment condition around the AV 103 and information related to the objects. The one or more subjects may include humans that are present around the AV 103 may be performing a gesture to commute with the AV 103. For example, a traffic police may be performing a stop gesture at a signal indicating the AV 103 to stop at that instance. In another embodiment, upon detecting humans, the context generation module 202 may focus on humans and process the plurality of frames for gesture identification.

The contextual parameters generation module 203 may generate a plurality of parameters associated with the context information. The plurality of parameters may include relational parameters and temporal parameters for sampling incoming plurality of frames. The contextual parameters generation module 203 utilises the location information (i.e., position of the AV 103 with respect to the global map) and the context information to generate the relation parameter and the temporal parameter. The plurality of parameters is responsible for controlling the number of plurality of frames and time interval between each of the plurality of frames for sampling the plurality of frames. In an embodiment, the plurality of parameters is dynamically updated as the driving conditions changes throughout a driving path. For example, the contextual parameters generation module 203 considers a difference between a busy urban scenario and a highway commute, based on location information of the AV 103. The busy urban streets are likely to have lots of subjects such as pedestrians and traffic police with an average vehicle speed being comparatively low. This scenario may trigger the contextual parameters generation module 203 to suggest a small-time interval (temporal parameter) between the plurality of frames and a high number of plurality of frames (relational parameter) as input for sampling the plurality of frames. In such scenario, the contextual parameters generation module 203 also considers context information to determine current visibility and human/vehicle density around the AV 103 to generate the temporal parameter and relational parameter accordingly. Whereas, in a highway or interstate scenario, the AV 103 may rarely encounter any humans and number of events are less. Hence, the relational parameter may be set to very low and temporal parameter may be set to very high for sampling the plurality of frames.

The sampling module 204 may sample the incoming plurality of frames based on the plurality of parameters (i.e., the relational parameters and the temporal parameters) received from the contextual parameters generation module 203. The sampling module 204 provides sampled frames to the pose estimation module 205 for further processing to determine current behaviour and predict gesture of the one or more subjects present nearby the AV 103.

The pose estimation module 205 may estimate the current pose and the one or more subsequent poses for the one or more subjects from the sampled frames. In an embodiment, the pose estimation module 205 estimates three-dimensional pose of the one or more subjects from each of the sampled frames using the deep learning techniques. The deep learning techniques may track movements of the one or more subjects in the each of the sampled frames across time instances for estimating the three-dimensional pose. For example, the current pose of the one or more subjects may be lifting of a hand to perform a 'go' gesture. Similarly, example of the one or more subsequent poses may be different positions of lifting of the hand to perform the 'go' gesture.

The future pose prediction module 206 may predict the one or more subsequent poses which may be performed by the one or more subjects based on the one or more factors using the deep learning techniques. The deep learning techniques, may include, but is not limited to, a deep reinforcement learning technique, a convolutional neural network, recurrent neural network, and the like. The one or more factors are associated with estimated poses of the one or more subjects received from the pose estimation module 205. The one or more factors may include a number of one or more estimated poses and time interval between each of the one or more estimated poses for the one or more subjects. In an embodiment, the prediction of the one or more subsequent poses may be performed using three-dimensional convolutional layer. The three-dimensional convolutional layer predicts the one or more subsequent poses depending on number of one or more estimated poses supplied, and the time interval between each of the one or more estimated poses. For example, nth pose is predicted based on (n−1) estimated poses supplied by the pose estimation module 205 and time difference between the (n−1) poses for a subject. In an embodiment, nth predicted pose will be considered as estimated pose, along with (n−1) estimated poses supplied for predicting (n+1)th pose for the subject by the future pose prediction module 206.

Once the one or more subsequent poses of the one or more subjects are predicted, the gesture category inference module 207 may infer a gesture category for the one or more subsequent poses across timestamps from the plurality of predefined gesture categories. The inferred gesture category indicates a gesture for the one or more subjects before it is actually performed by the one or more subjects. In an embodiment, the gesture category indicates behaviour of the one or more subjects classified based on the current pose, the one or more subsequent poses and the pre-existing gesture data. For example, the one or more subsequent poses may be classified into "go" gesture category. The classification of the one or more subsequent poses are performed by comparing the current pose, and the one or more subsequent poses along with timestamps with the pre-existing gesture data.

The gesture inferring module 208 may predict the gesture which is to be performed by the one or more subjects based on the respective gesture category, the information associated with the one or more subjects, and the context information, for controlling the AV 103 during navigation. In an embodiment, the predicted gesture is a final behaviour inference of the one or more subjects based on which the AV 103 is controlled. For example, consider that the inferred gesture category for the one or more subsequent poses is a "turn left" gesture and the subject performing the gesture is standing at a road intersection. The gesture inferring module 208 utilises the inferred gesture category, the information of the subject and also the context information such as whether the subject is near the AV 103 and so on to control operation of the AV 103. Further, the gesture inferring module 208 may determine the priority of the gesture based on the information of the one or more subjects. For example, a "Stop" gesture from a traffic personnel may demand that the AV 103 stops at the designated line which, depending on a distance to a junction, may require a slow or medium deceleration. However, if the same "Stop" gesture is signalled by a pedestrian, it might demand urgency requiring a much higher deceleration and hence may be given a high priority.

The path determination module 209 determines navigation path dynamically to be followed by the AV 103 during navigation. The path determination module 209 also determines a change in the navigation path upon receiving information on gesture of the one or more subjects surrounding the AV 103. In particular, based on the priority of the gesture associated with the one or more subjects surrounding the AV 103 and the location of the AV 103 on the global map, the path determination module may plan a local trajectory of the AV 103 dynamically, so that the AV 103 reaches its destination timely and safely.

The one or more modules 200 may include other modules 210 such as a mapping and a localization module for creating the global map for operational region for the AV 103 and localizing the AV 103 in the global map. The one or more modules 200 may also include other modules 210 such as a control module for providing instructions to the AV 103 to maneuver along the navigational path of the AV 103 based on the predicted gesture and the location information. Also, the other modules 210 may perform various miscellaneous functionalities of the gesture prediction system 101. It will be appreciated that such modules may be represented as a single module or a combination of different modules.

Figure 3A:
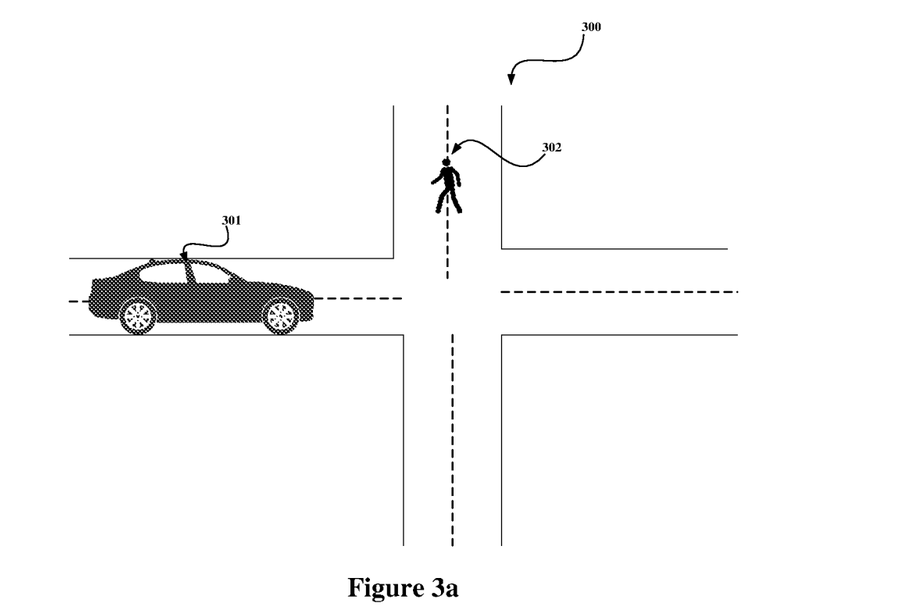
FIGS. 3a and 3b show exemplary scenarios for predicting a gesture of a subject for controlling an autonomous car during navigation, in accordance with some embodiments of present disclosure.
Figure 3B:
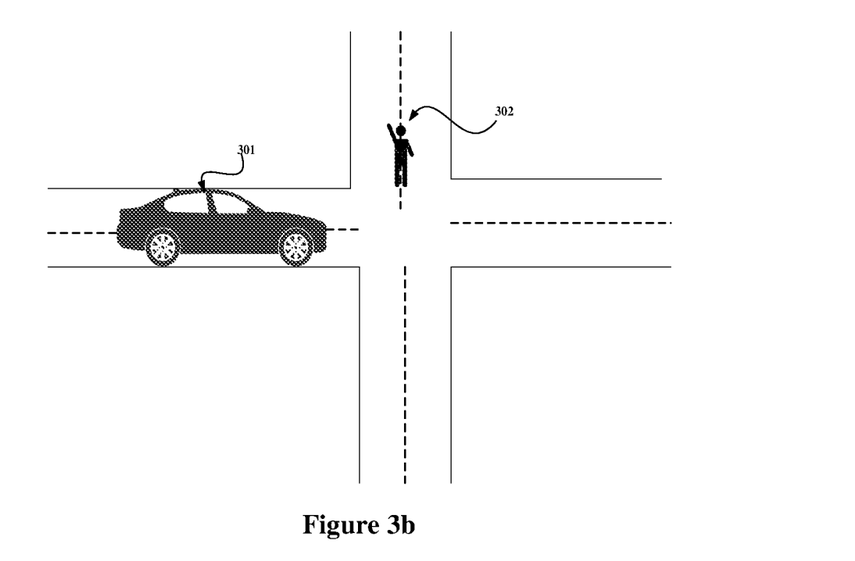

FIGS. 3*a* and 3*b* show exemplary scenarios for predicting a gesture of subjects for controlling an autonomous car during navigation, in accordance with some embodiments of present disclosure. FIG. 3*a* shows an environment 300 which includes an autonomous car 301, and a subject 302. The subject 302 may be pedestrian intending to perform a particular gesture to communicate with the autonomous car 301. The autonomous car 301 includes the one or more sensors 102 which is used to capture the current environment of the autonomous car 301. The gesture prediction system 101 of the autonomous car 301 generates context information of the current environment and also generates parameters for controlling plurality of frames of the current environment. The parameters are used for sampling the plurality of frames for determining the gesture of the subject 302. The gesture prediction system 101 of the autonomous car 301 estimates what is the current pose of the subject 302 and the one or more subsequent poses using the deep learning techniques. In the current scenario as shown in FIG. 3*a*, the current pose of the subject 302 may be partially lifting of one hand while seeing the autonomous car 301 approaching the junction. The one or more subsequent poses may be different positions of the hand of the subject 302 while performing the particular gesture. The gesture prediction system 101 of the autonomous car 301 predicts the one or more subsequent poses which is to be performed by the subject 302. One pose of the one or more subsequent poses as shown in FIG. 3*b* may be complete lifting of the hand by the subject 302 in the air indicating a stop pose to the autonomous car 301. Further, the gesture prediction system 101 classifies the one or more subsequent poses into the plurality of predefined gesture categories to infer the current behaviour of the subject 302. The gesture prediction system 101 infers that the subject 302 may be performing a stop gesture based on the classification of the one or more subsequent poses. The gesture prediction system 101 predicts the gesture of the subject 302 based on the inference, information of the subject 302 and the context information. For example, in this scenario the gesture prediction system 101 predicts that the subject 302 is performing a stop gesture and the subject 302 is moving towards intersection of the road. Thus, the AV 103 may immediately stop and allow the subject 302 to cross the road.

Figure 4:
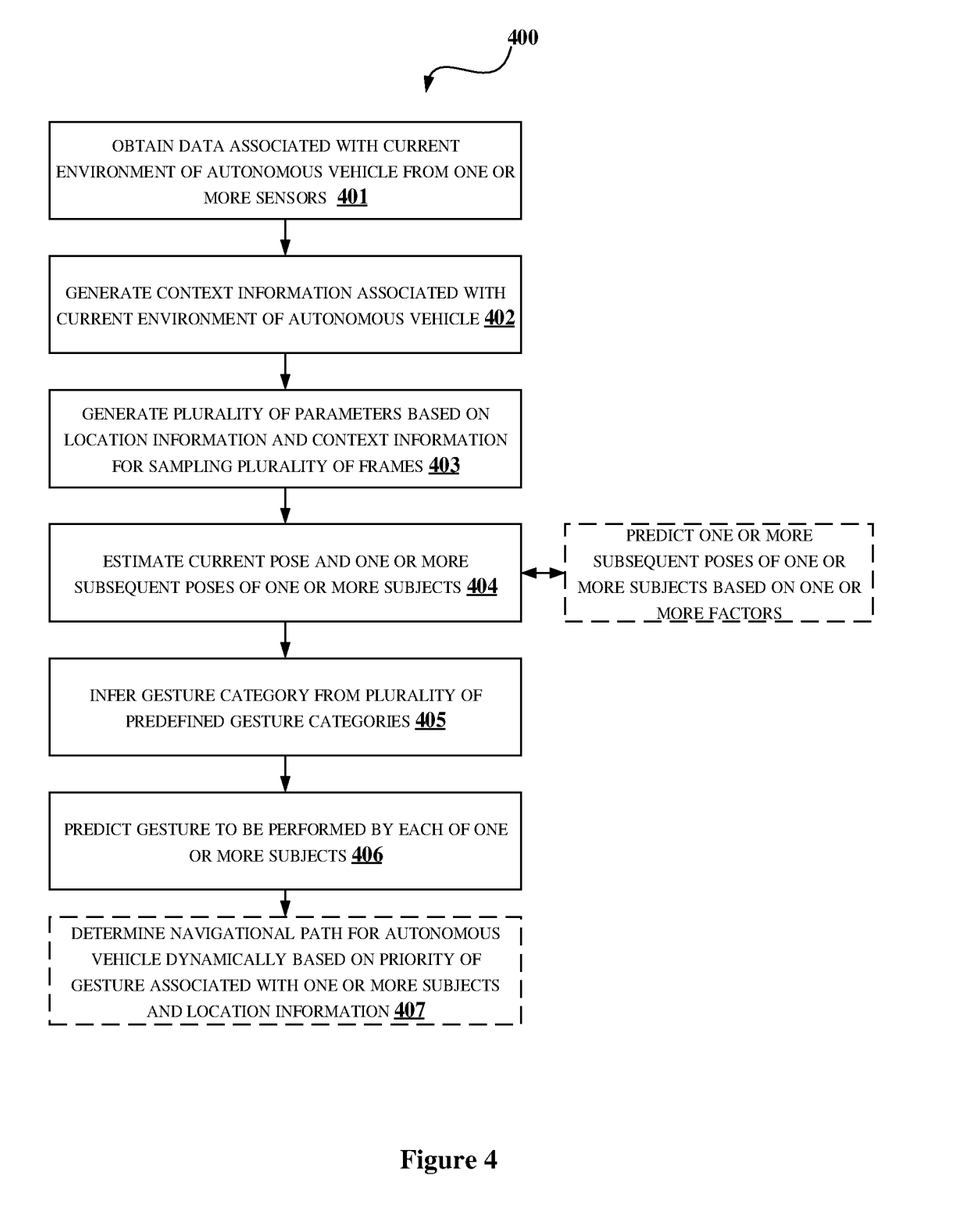
FIG. 4 illustrates a flow diagram showing exemplary method for predicting a gesture of subjects for controlling the AV during navigation, in accordance with some embodiments of present disclosure.

FIG. 4 illustrates a flow diagram showing exemplary method for predicting a gesture of subjects for controlling an Autonomous Vehicle (AV) during navigation, in accordance with some embodiments of present disclosure.

As illustrated in FIG. 4, the method 400 may include one or more blocks for executing processes in the gesture prediction system 101. The method 400 may be described in the general context of computer executable instructions. Generally, computer executable instructions can include routines, programs, objects, components, data structures, procedures, modules, and functions, which perform particular functions or implement particular abstract data types.

The order in which the method 400 are described may not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At block 401, obtaining, by the data input module 201, the data associated with the current environment of the AV 103 from the one or more sensors 102 associated with the AV 103. The data comprises the plurality of frames and the location information of the AV 103.

At block 402, generating, by the context generation module 202, the context information associated with the current environment of the AV 103 based on the obtained data. The context information comprises information associated with the current environment and information associated with one or more subjects present in the current environment of the AV 103. The context information also comprises number of objects present around the AV 103 and information related to the objects.

At block 403, generating, by the contextual parameters generation module 203, the plurality of parameters based on the location information and the context information for sampling the plurality of frames. The plurality of parameters comprise relational parameters and temporal parameters associated with the context information for sampling incoming plurality of frames by controlling number of the plurality of frames and time interval between each of the plurality of frames, respectively.

At block 404, estimating, by the pose estimation module 205, the current pose and the one or more subsequent poses of each of one or more subjects from each sampled frames using the deep learning technique. The estimation of the one or more subsequent poses includes predicting, the one or more subsequent poses to be performed by each of the one or more subjects based on the one or more factors associated with corresponding estimated poses of the one or more subjects using the deep learning technique. In an embodiment, the prediction of the one or more subsequent poses includes estimating a motion associated with the current pose and the one or more subsequent poses corresponding to each of the one or more subjects and predict extrapolating the respective motion using the deep learning technique. In another embodiment, the current pose and the one or more subsequent poses is concatenated by temporally sequencing the current pose, and the one or more subsequent poses one after another. The concatenated pose data of the each of one or more subjects may be supplied further to classify the motions of the pose data (current pose and one or more subsequent poses) based on pre-existing gesture data.

At block 405, inferring, by the gesture category inference module 207, the gesture category from the plurality of predefined gesture categories, for the current pose and one or more subsequent poses of each of the one or more subjects. The gesture category is inferred based on comparing corresponding current pose, the one or more subsequent poses of each of the one or more subjects and pre-existing gesture data.

At block 406, predicting, by the gesture inferring module 208, the gesture to be performed by each of the one or more subjects based on respective gesture category, the information associated with the one or more subjects, and the context information, for controlling the AV 103 during navigation.

Further, in an embodiment, at block 407, determining by the path determination module 209, a navigational path for the AV 103 dynamically based on a priority of the gesture associated with the one or more subjects surrounding the AV 103, and the location information. In another embodiment, the navigational path may be determined based on the gesture and its priority along with location of the AV 103 in the global map to dynamically plan a local trajectory for the AV 103. In another embodiment, the navigational path may be used to generate control signals for throttle, brake, steer, and so on, accordingly for vehicle maneuvering.

Figure 5:
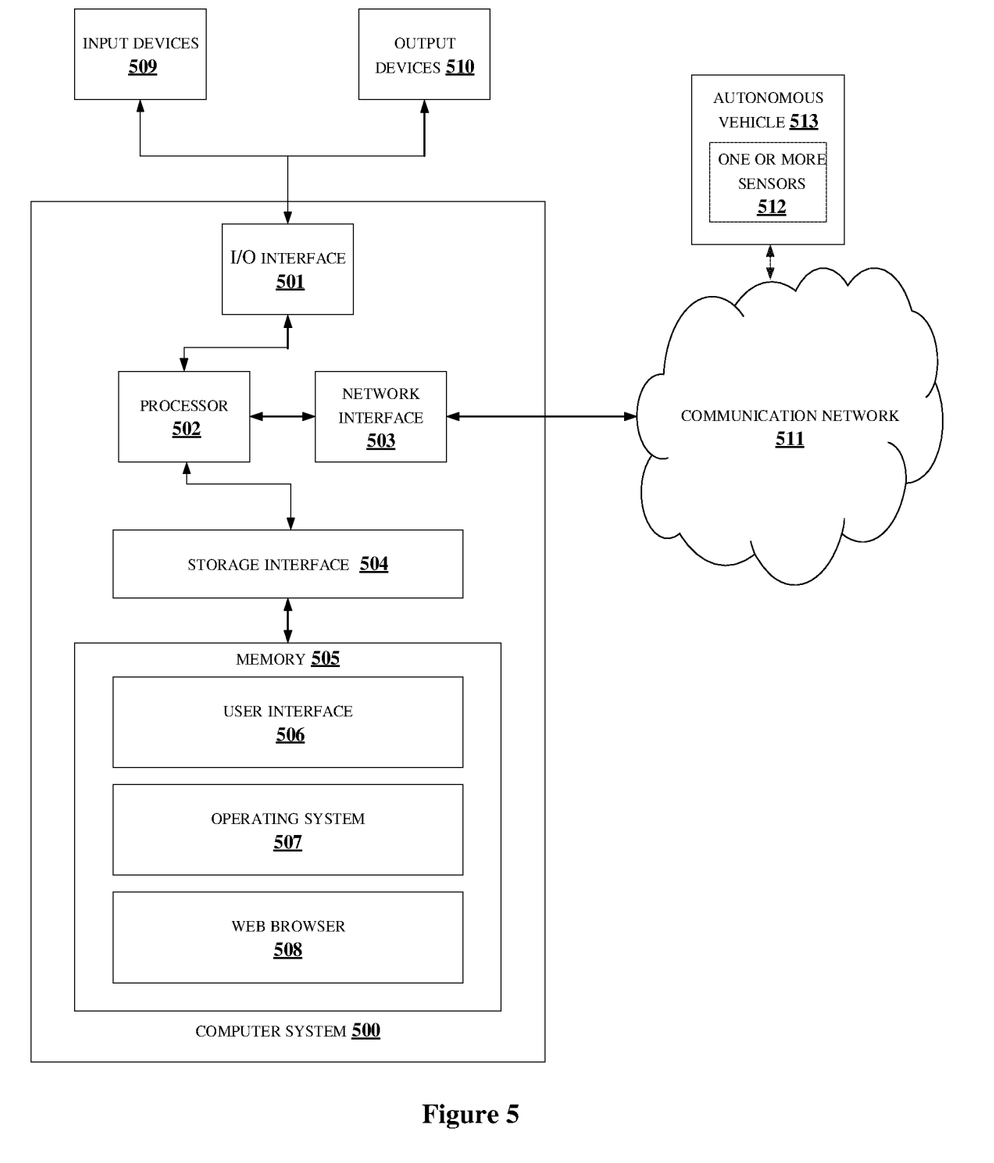
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 is used to implement the gesture prediction system 101. The computer system 500 may include a central processing unit ("CPU" or "processor") 502. The processor 502 may include at least one data processor for executing processes in Virtual Storage Area Network. The processor 502 may include specialized processing units such as, integrated system (bus) controllers, memory management control units, floating point units, graphics processing units, digital signal processing units, etc.

The processor 502 may be disposed in communication with one or more input/output (I/O) devices 509 and 510 via I/O interface 501. The I/O interface 501 may employ communication protocols/methods such as, without limitation, audio, analog, digital, monaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices 509 and 510. For example, the input devices 509 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output devices 510 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 may consist of the gesture prediction system 101. The processor 502 may be disposed in communication with the communication network 511 via a network interface 503. The network interface 503 may communicate with the communication network 511. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 511 may include, without limitation, a direct interconnection, local area network (LAN), wide area network (WAN), wireless network (e.g., using Wireless Application Protocol), the Internet, etc. Using the network interface 503 and the communication network 511, the computer system 500 may communicate with one or more sensors 512 of AV 513 for predicting a gesture of subjects for controlling the AV 513 during navigation. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 511 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi, and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™, GOOGLE® ANDROID™, BLACKBERRY® OS, or the like.

In some embodiments, the computer system 500 may implement a web browser 508 stored program component. The web browser 508 may be a hypertext viewing application, such as Microsoft Internet Explorer, Google Chrome, Mozilla Firefox, Apple Safari, etc. Secure web browsing may be provided using Hypertext Transport Protocol Secure (HTTPS), Secure Sockets Layer (SSL), Transport Layer Security (TLS), etc. Web browser 508 may utilize facilities such as AJAX, DHTML, Adobe Flash, JavaScript, Java, Application Programming Interfaces (APIs), etc. In some embodiments, the computer system 500 may implement a mail server stored program component. The mail server may be an Internet mail server such as Microsoft Exchange, or the like. The mail server may utilize facilities such as ASP, ActiveX, ANSI C++/C#, Microsoft.NET, Common Gateway Interface (CGI) scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the computer system 500 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

An embodiment of the present disclosure provisions a method for forecasting the gesture of one or more subjects for controlling the autonomous vehicle (AV) during navigation. The proposed method and system enable the AV to be aware of subjects surrounding the AV and their behaviour that are interacting with the AV, and accordingly decide a trajectory and a path to be followed by the AV for reaching its destination in less time without encountering collision.

An embodiment of the present disclosure helps in preserving CPU cycles by eliminating unnecessary frames and focusing on relevant frames using the relational and temporal parameter which is associated with the context information and the location information of the AV, while determining poses associated with one or more subjects surrounding the AV.

An embodiment of the present disclosure aids in preventing any accidents by predicting the gesture which is to be performed by the subject at a faster rate.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMS, DRAMs, SRAMs, Flash Memory, firmware, programmable logic, etc.), etc. Further, non-transitory computer-readable media may include all computer-readable media except for a transitory. The code implementing the described operations may further be implemented in hardware logic (e.g., an integrated circuit chip, Programmable Gate Array (PGA), Application Specific Integrated Circuit (ASIC), etc.).

An "article of manufacture" includes non-transitory computer readable medium, and/or hardware logic, in which code may be implemented. A device in which the code implementing the described embodiments of operations is encoded may include a computer readable medium or hardware logic. Of course, those skilled in the art will recognize that many modifications may be made to this configuration without departing from the scope of the invention, and that the article of manufacture may include suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 shows certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

| Referral numerals: | |
|---|---|
| Reference Number | Description |
| 100 | Environment |
| 101 | Gesture prediction system |
| 102 | One or more sensors |
| 103 | Autonomous vehicle |
| 104 | Processor |
| 105 | I/O interface |
| 106 | Memory |
| 200 | Modules |
| 201 | Data input module |
| 202 | Context generation module |
| 203 | Contextual Parameters generation module |
| 204 | Sampling module |
| 205 | Pose estimation module |
| 206 | Future pose prediction module |
| 207 | Gesture category inference module |
| 208 | Gesture inferring module |
| 209 | Path determination module |
| 210 | Other modules |
| 211 | Data |
| 212 | Sensor data |
| 213 | Context information |
| 214 | Sampled data |
| 215 | Pose data |

-continued

| Referral numerals: | |
|---|---|
| Reference Number | Description |
| 216 | Pre-existing gesture data |
| 217 | Category data |
| 218 | Gesture data |
| 219 | Other data |
| 301 | Autonomous car |
| 302 | Subject |
| 500 | Computer system |
| 501 | I/O Interface |
| 502 | Processor |
| 503 | Network interface |
| 504 | Storage interface |
| 505 | Memory |
| 506 | User interface |
| 507 | Operating system |
| 508 | Web browser |
| 509 | Input devices |
| 510 | Output devices |
| 511 | Communication network |
| 512 | One or more sensors |
| 513 | Autonomous vehicle |

What is claimed is:

1. A method of predicting a gesture of subjects for controlling an Autonomous Vehicle (AV) during navigation, the method comprising:
obtaining, by a gesture prediction system, data associated with a current environment of the AV from one or more sensors associated with the AV, wherein the data comprises a plurality of frames and location information of the AV;
generating, by the gesture prediction system, context information associated with the current environment of the AV based on the obtained data, wherein the context information comprises information associated with the current environment and information associated with one or more subjects present in the current environment;
generating, by the gesture prediction system, a plurality of parameters based on the location information and the context information for sampling the plurality of frames;
estimating, by the gesture prediction system, a current pose and one or more subsequent poses of each of one or more subjects from each sampled frames using a deep learning technique, wherein estimating the one or more subsequent poses comprising:
predicting the one or more subsequent poses to be performed by each of the one or more subjects based on one or more factors associated with corresponding previous poses of the one or more subjects using the deep learning technique;
inferring, by the gesture prediction system, a gesture category from a plurality of predefined gesture categories, for the one or more subsequent poses of each of the one or more subjects, based on corresponding current pose, the one or more subsequent poses and pre-existing gesture data; and
predicting, by the gesture prediction system, a gesture to be performed by each of the one or more subjects based on respective gesture category, the information associated with the one or more subjects, and the context information, for controlling the AV during navigation.

2. The method as claimed in claim 1, wherein the context information further comprises, number of objects present around the AV and information related to the objects, and wherein the information associated with the one or more subjects comprises a category of the one or more subjects, location of the one or more subjects, and movement information of the one or more subjects.

3. The method as claimed in claim 1, wherein the plurality of parameters comprises relational parameters and temporal parameters configured based on the context information and location information for sampling the plurality of frames by controlling number of the plurality of frames and a time interval between each of the plurality of frames, respectively.

4. The method as claimed in claim 1, wherein predicting the one or more subsequent poses of the one or more subjects comprises:
   estimating, by the gesture prediction system, motion associated with the current pose and the one or more subsequent poses estimated corresponding to the one or more subjects; and
   predicting, by the gesture prediction system, a subsequent pose of the one or more subjects by extrapolating the respective motion using the deep learning technique.

5. The method as claimed in claim 1, wherein the one or more factors for the one or more subjects comprise a number of one or more estimated poses and time interval between each of the one or more estimated poses.

6. The method as claimed in claim 1, wherein controlling the AV during navigation comprises:
   determining, by the gesture prediction system, a navigational path for the AV dynamically based on a priority of the gesture associated with the one or more subjects surrounding the AV, and the location information.

7. A gesture prediction system for predicting a gesture of subjects for controlling an Autonomous Vehicle (AV) during navigation, comprising:
   a processor; and
   a memory communicatively coupled to the processor, wherein the memory stores processor-executable instructions, which, on execution, cause the processor to:
      obtain data associated with a current environment of the AV from one or more sensors associated with the AV, wherein the data comprises a plurality of frames and location information of the AV;
      generate context information associated with the current environment of the AV based on the obtained data, wherein the context information comprises information associated with the current environment and information associated with one or more subjects present in the current environment;
      generate a plurality of parameters based on the location information and the context information for sampling the plurality of frames;
      estimate a current pose and one or more subsequent poses of each of one or more subjects from each sampled frames using a deep learning technique, wherein the processor is configured to estimate the one or more subsequent poses by:
         predicting the one or more subsequent poses to be performed by each of the one or more subjects based on one or more factors associated with corresponding previous poses of the one or more subjects using the deep learning technique;
      infer a gesture category from a plurality of predefined gesture categories, for the one or more subsequent poses of each of the one or more subjects, based on corresponding current pose, the one or more subsequent poses and pre-existing gesture data; and
      predict a gesture to be performed by each of the one or more subjects based on respective gesture category, the information associated with the one or more subjects, and the context information, for controlling the AV during navigation.

8. The gesture prediction system as claimed in claim 7, wherein the context information further comprises number of objects present around the AV and information related to the objects, and, wherein the information associated with the one or more subjects comprises a category of the one or more subjects, location of the one or more subjects, and movement information of the one or more subjects.

9. The gesture prediction system as claimed in claim 7, wherein the plurality of parameters comprises relational parameters and temporal parameters configured based on the context information and location information for sampling the plurality of frames by controlling number of the plurality of frames and a time interval between each of the plurality of frames, respectively.

10. The gesture prediction system as claimed in claim 7, wherein the processor is configured to predict the one or more subsequent poses of the one or more subjects by:
    estimating motion associated with the current pose and the one or more subsequent poses estimated corresponding to each of the one or more subjects; and
    predicting a subsequent pose of each of the one or more subjects by extrapolating the respective motion using the deep learning technique.

11. The gesture prediction system as claimed in claim 7, wherein the one or more factors for the one or more subjects comprise a number of one or more estimated poses and time interval between each of the one or more estimated poses.

12. The gesture prediction system as claimed in claim 7, wherein the processor controls the AV during navigation by:
    determining a navigational path for the AV dynamically based on a priority of the gesture associated with the one or more subjects surrounding the AV, and the location information.

13. A non-transitory computer readable medium including instruction stored thereon that when processed by at least one processor cause a gesture prediction system to perform operation comprising:
   obtaining data associated with a current environment of the AV from one or more sensors associated with the AV, wherein the data comprises a plurality of frames and location information of the AV;
   generating context information associated with the current environment of the AV based on the obtained data, wherein the context information comprises information associated with the current environment and information associated with one or more subjects present in the current environment;
   generating a plurality of parameters based on the location information and the context information for sampling the plurality of frames;
   estimating a current pose and one or more subsequent poses of each of one or more subjects from each sampled frames using a deep learning technique, wherein estimating the one or more subsequent poses comprising:
      predicting the one or more subsequent poses to be performed by each of the one or more subjects based on one or more factors associated with corresponding previous poses of the one or more subjects using the deep learning technique;
   inferring a gesture category from a plurality of predefined gesture categories, for the one or more subsequent poses of each of the one or more subjects, based on corresponding current pose, the one or more subsequent poses and pre-existing gesture data; and predicting a gesture to be performed by each of the one or more subjects based on respective gesture category, the information associated with the one or more subjects, and the context information, for controlling the AV during navigation.

\* \* \* \* \*